(12) United States Patent
Rahman et al.

(10) Patent No.: US 12,097,859 B2
(45) Date of Patent: Sep. 24, 2024

(54) VEHICLE LANE-CHANGE OPERATIONS

(71) Applicant: Ford Global Technologies, LLC, Dearborn, MI (US)

(72) Inventors: Yousaf Rahman, Ypsilanti, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 17/533,271

(22) Filed: Nov. 23, 2021

(65) Prior Publication Data
US 2023/0159032 A1    May 25, 2023

(51) Int. Cl.
*B60W 10/04*    (2006.01)
*B60W 10/18*    (2012.01)
(Continued)

(52) U.S. Cl.
CPC ...... *B60W 30/18163* (2013.01); *B60W 10/04* (2013.01); *B60W 10/18* (2013.01); *B60W 10/20* (2013.01); *B60W 50/00* (2013.01); *B60W 2050/0022* (2013.01); *B60W 2510/20* (2013.01); *B60W 2520/105* (2013.01); *B60W 2540/215* (2020.02); *B60W 2552/10* (2020.02);
(Continued)

(58) Field of Classification Search
CPC ........... B60W 30/18163; B60W 10/04; B60W 10/18; B60W 10/20; B60W 50/00; B60W 2050/0022; B60W 2510/20; B60W 2520/105; B60W 2540/215; B60W 2552/10; B60W 2554/4041; B60W 2554/4042; B60W 2554/804; B60W 2710/18; B60W 2710/20; B60W 2720/106; B60W 30/12

USPC ........................................................... 701/25
See application file for complete search history.

(56) References Cited

U.S. PATENT DOCUMENTS 10,860,027 B2    12/2020    Nilsson
2006/0217866 A1*    9/2006    Moebus ............. B60K 31/0008
                                                                    701/93
(Continued)

FOREIGN PATENT DOCUMENTS

CN    111275249 A    6/2020
WO    2019204053 A1    10/2019

OTHER PUBLICATIONS

Di Cairano et al., "An MPC design flow for automotive control and applications to idle speed regulation", Proceedings of the 47th IEEE Conference on Decision and Control Cancun, Mexico, Dec. 9-11, 2008.

*Primary Examiner* — Yonel Beaulieu
*Assistant Examiner* — Jean W Charleston
(74) *Attorney, Agent, or Firm* — Frank A. MacKenzie; Bejin Bieneman PLC

(57) ABSTRACT

A speed of a target vehicle in a target lane of operation is determined relative to a host vehicle in a host lane of operation. A virtual boundary is determined around the target vehicle based on the speed of the target vehicle. A position in the target lane and outside the virtual boundary is selected based on a) a first cost function for a deviation of a speed of the host vehicle from a requested speed, and b) a second cost function for a frequency of lane changes. Upon determining to move the host vehicle from the host lane to the target lane, the host vehicle is operated to the position in the target lane.

19 Claims, 10 Drawing Sheets

(51) Int. Cl.
 B60W 10/20 (2006.01)
 B60W 30/18 (2012.01)
 B60W 50/00 (2006.01)

(52) U.S. Cl.
 CPC ............... *B60W 2554/4041* (2020.02); *B60W 2554/4042* (2020.02); *B60W 2554/804* (2020.02); *B60W 2710/18* (2013.01); *B60W 2710/20* (2013.01); *B60W 2720/106* (2013.01)

(56) References Cited

U.S. PATENT DOCUMENTS

| | | | |
|---|---|---|---|
| 2018/0059670 A1* | 3/2018 | Nilsson | B60W 30/18163 |
| 2018/0208199 A1* | 7/2018 | Fujita | B60W 60/0016 |
| 2019/0071092 A1* | 3/2019 | Ma | B60W 30/18163 |
| 2019/0071126 A1 | 3/2019 | Giersiefer et al. | |
| 2019/0253103 A1* | 8/2019 | Mittnacht | H04B 3/50 |
| 2020/0189580 A1* | 6/2020 | Schmidt | B60W 60/00276 |
| 2021/0031772 A1* | 2/2021 | Gomora | B60W 30/09 |
| 2021/0114617 A1* | 4/2021 | Phillips | B60W 30/0956 |
| 2021/0394786 A1* | 12/2021 | Zhu | B60W 30/18163 |

\* cited by examiner

VEHICLE LANE-CHANGE OPERATIONS

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
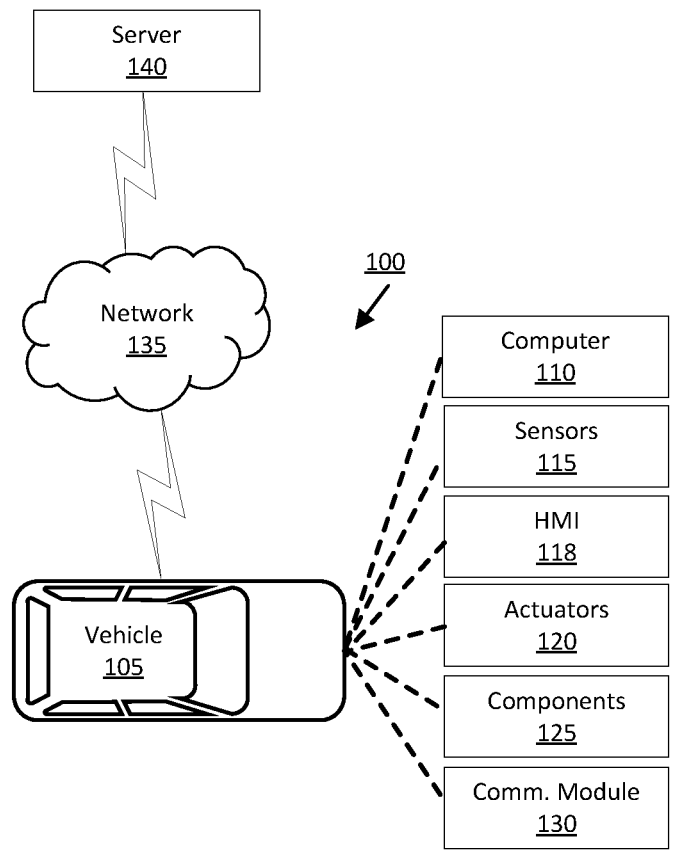
FIG. 1 is a block diagram illustrating an example vehicle control system for a vehicle.

Planning operation of a host vehicle can include a plan for the host vehicle to remain within a host lane on a road or to move to a target lane. A computer in the host vehicle actuates one or more components according to a planned operation, e.g., steering, acceleration, and/or braking. Upon identifying a target vehicle, the computer can identify virtual boundaries for the target vehicle based on a speed of the target vehicle, and plan operation of the host vehicle to remain outside the virtual boundaries. The virtual boundaries allow the host vehicle to predict movement of the host vehicle and the target vehicle with less data and fewer computations than other approaches, e.g., a machine learning program.

Movement of a target vehicle can result in changes to the planned operation of the host vehicle. For example, the computer may adjust a longitudinal acceleration of the host vehicle and/or a lane of operation of the host vehicle to avoid impacting a target vehicle. Advantageously, the computer can select a position relative to the target vehicle for the host vehicle by minimizing a first cost function for a deviation of a speed of the host vehicle from a requested speed, and a second cost function for a frequency of lane changes subject to the virtual boundaries. The computer then operates the host vehicle to the position. Minimizing the first and second cost functions subject to the virtual boundaries allows the computer to operate the host vehicle while minimizing a deviation of the host vehicle speed from the requested speed, avoiding impacting the target vehicles, and reducing a frequency of lane changes. That is, the computer optimizes the planned operation of the host vehicle by selecting the position that minimizes longitudinal acceleration of the host vehicle and lane changes by the host vehicle.

A system includes a computer including a processor and a memory, the memory storing instructions executable by the processor to determine, relative to a host vehicle in a host lane of operation, a speed of a target vehicle in a target lane of operation. The instructions further include instructions to determine a virtual boundary between the host vehicle and the target vehicle based on the speed of the target vehicle. The instructions further include instructions to select, relative to the target vehicle, a position in the target lane and outside the virtual boundary based on a) a first cost function for a deviation of a speed of the host vehicle from a requested speed, and b) a second cost function for a frequency of lane changes. The instructions further include instructions to, upon determining to move the host vehicle from the host lane to the target lane, operate the host vehicle to the position in the target lane.

The instructions can further include instructions to determine the requested speed based on map data.

The instructions can further include instructions to determine the requested speed based on a user input.

The second cost function can include a weight parameter and a decay rate reducing the weight parameter over time. The instructions can further include instructions to determine the weight parameter based on a user input.

The instructions can further include instructions to determine a longitudinal acceleration for the host vehicle based on the first cost function.

The instructions can further include instructions to, upon determining the first and second cost functions are minimized for the target lane, determine a steering angle for the host vehicle to move the host vehicle to the position in the target lane.

The second cost function can include slack variables for the target vehicle to prevent violation of the virtual boundaries by the steering angle. The instructions can further include instructions to prevent the host vehicle from operating into the target lane based on at least one slack variable being greater than a threshold.

The instructions can further include instructions to, based on detecting the target vehicle is in front of or next to the host vehicle relative to a direction of travel of the host vehicle, actuate a propulsion component and a steering component to operate the host vehicle to the position upon determining the position is in front of the target vehicle.

The instructions can further include instructions to, based on detecting the target vehicle is behind or next to the host vehicle relative to a direction of travel of the host vehicle, actuate a brake component and a steering component to operate the host vehicle to the position upon determining the position is behind the target vehicle.

The instructions can further include instructions to determine, relative to the host vehicle, a speed of a second target vehicle in the target lane. The instructions can further include instructions to determine a second virtual boundary for the second target vehicle based on the speed of the second target vehicle. The instructions can further include instructions to select the position in the target lane based additionally on the second virtual boundary.

The position may be between the target vehicle and the second target vehicle. The instructions can further include instructions to actuate a steering component and at least one of a propulsion component or a brake component to operate the host vehicle to the position based on determining, relative to the host vehicle, respective positions of the target vehicle and the second target vehicle.

The instructions can further include instructions to determine to move the host vehicle to the target lane based on a user input.

The instructions can further include instructions to determine to move the host vehicle to the target lane based on determining the first and second cost functions are minimized for the target lane.

The instructions can further include instructions to determine to move the host vehicle to the target lane based on map data.

The instructions can further include instructions to determine to maintain the host vehicle in the host lane based on determining the first and second cost functions are minimized for the host lane.

A method includes determining, relative to a host vehicle in a host lane of operation, a speed of a target vehicle in a target lane of operation. The method further includes determining a virtual boundary between the host vehicle and the target vehicle based on the speed of the target vehicle. The method further includes selecting, relative to the target vehicle, a position in the target lane and outside the virtual boundary based on a) a first cost function for a deviation of a speed of the host vehicle from a requested speed, and b) a second cost function for a frequency of lane changes. The method further includes, upon determining to move the host vehicle from the host lane to the target lane, operating the host vehicle to the position in the target lane.

The method can further include determining to move the host vehicle to the target lane based on determining the first and second cost functions are minimized for the target lane.

The method can further include determining to maintain the host vehicle in the host lane based on determining the first and second cost functions are minimized for the host lane.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5C, an example vehicle control system 100 includes a host vehicle 105. A vehicle computer 110 in the host vehicle 105 receives data from sensors 115. The vehicle computer 110 is programmed to determine, relative to the host vehicle 105 in a host lane 205 of operation, a speed of a target vehicle 215 in a target lane 210 of operation. The vehicle computer 110 is further programmed to determine a virtual boundary 225 between the host vehicle 105 and the target vehicle 215 based on the speed of the target vehicle 215. The vehicle computer 110 is further programmed to select a position, relative to the target vehicle 215, in the target lane 210 and outside the virtual boundary 225 based on a) a first cost function for a deviation of a speed of the host vehicle 105 from a requested speed, and b) a second cost function for a frequency of lane changes. The vehicle computer 110 is further programmed to, upon determining to move the host vehicle 105 from the host lane 205 to the target lane 210, operate the host vehicle 105 to the position in the target lane 210.

Turning now to FIG. 1, the host vehicle 105 includes the vehicle computer 110, sensors 115, actuators 120 to actuate various vehicle components 125, and a vehicle communication module 130. The communication module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out host vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the host vehicle 105 in an autonomous mode, a semi-autonomous mode, or a non-autonomous (or manual) mode, i.e., can control and/or monitor operation of the host vehicle 105, including controlling and/or monitoring components 125. For purposes of this disclosure, an autonomous mode is defined as one in which each of host vehicle 105 propulsion, braking, and steering are controlled by the vehicle computer 110; in a semi-autonomous mode the vehicle computer 110 controls one or two of host vehicle 105 propulsion, braking, and steering; in a non-autonomous mode a human operator controls each of host vehicle 105 propulsion, braking, and steering.

The vehicle computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the host vehicle 105 for monitoring and/or controlling various vehicle components 125, e.g., a transmission controller, a brake controller, a steering controller, etc. The vehicle computer 110 is generally arranged for communications on a vehicle communication network that can include a bus in the host vehicle 105 such as a controller area network (CAN) or the like, and/or other wired and/or wireless mechanisms.

Via the host vehicle 105 network, the vehicle computer 110 may transmit messages to various devices in the host vehicle 105 and/or receive messages (e.g., CAN messages)

from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Host vehicle 105 sensors 115 may include a variety of devices such as are known to provide data to the vehicle computer 110. For example, the sensors 115 may include Light Detection And Ranging (LIDAR) sensor 115(s), etc., disposed on a top of the host vehicle 105, behind a host vehicle 105 front windshield, around the host vehicle 105, etc., that provide relative locations, sizes, and shapes of objects surrounding the host vehicle 105. As another example, one or more radar sensors 115 fixed to host vehicle 105 bumpers may provide data to provide locations of the objects, second vehicles, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105, as well as other items including as discussed below, fall within the definition of "object" herein.

The vehicle computer 110 is programmed to receive data from one or more sensors 115, e.g., substantially continuously, periodically, and/or when instructed by a remote server computer 140, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the host vehicle 105. As one example, the data may be image data of the environment around the host vehicle 105. In such an example, the image data may include one or more objects and/or markings, e.g., lane markings, on or along a road. Image data herein means digital image data, i.e., comprising pixels, typically with intensity and color values, that can be acquired by camera sensors 115. The sensors 115 can be mounted to any suitable location in or on the host vehicle 105, e.g., on a host vehicle 105 bumper, on a host vehicle 105 roof, etc., to collect images of the environment around the host vehicle 105.

The host vehicle 105 actuators 120 are implemented via circuits, chips, or other electronic and or mechanical components that can actuate various host vehicle 105 subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation—such as moving the host vehicle 105, slowing or stopping the host vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The host vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the host vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
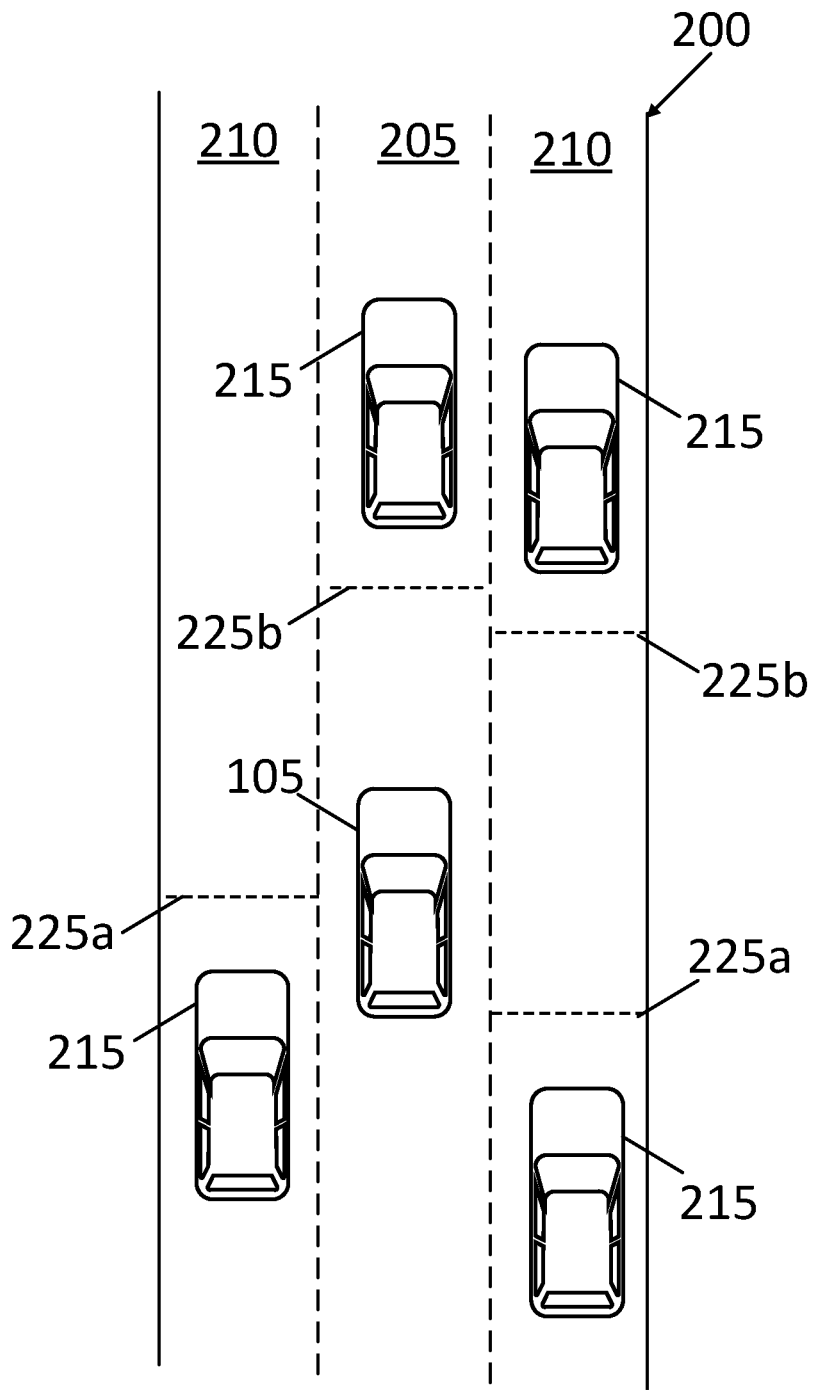
FIG. 2 is a diagram illustrating a host vehicle operating in an exemplary lane of an exemplary road.

FIG. 2 is a diagram illustrating a host vehicle 105 operating in a host lane 205 of an example road 200. A lane is a specified area of the road for vehicle travel. A road in the present context is an area of ground surface that includes any surface provided for land vehicle travel. A lane of a road is an area typically having a width intended to accommodate only one vehicle, i.e., such that multiple vehicles can travel in a lane one in front of the other, but not abreast of, i.e., laterally adjacent, one another. A road may include one or more lanes defined along a length of a road, i.e., a through lane, and one or more lanes defined along a radius of curvature to which a through lane is tangential, i.e., an entry or departure lane.

The vehicle computer 110 can define a local two-dimensional coordinate system. The local coordinate system defines points x, y, where x is a coordinate along a longitudinal axis of the host vehicle 105 and y is a coordinate along a lateral axis of the host vehicle 105. That is, x coordinates extend in a vehicle-forward and vehicle-rearward direction (sometimes referred to as a longitudinal direction), and y coordinates extend in a vehicle-crosswise direction (sometimes referred to as a lateral direction).

The vehicle computer 110 may be programmed to identify a host lane 205, i.e., a lane in which the host vehicle 105 is operating, and one or more target lanes 210, i.e., a lane in which the host vehicle 105 is not operating, on the road 200. For example, the vehicle computer 110 can receive map data and/or location data, e.g., GPS data, from a remote server computer 140 specifying the host lane 205 and the target lane(s) 210. As another example, the vehicle computer 110 may identify the host lane 205 and the target lane(s) 210 based on sensor 115 data. That is, the vehicle computer 110 can be programmed to receive sensor 115 data, typically, image data, from sensors 115 and to implement various image processing techniques to identify the host lane 205 and the target lane(s) 210. For example, lanes can be indicated by markings, e.g., painted lines on the road 200, and image recognition techniques, such as are known, can be executed by the vehicle computer 110 to identify the host lane 205. For example, the vehicle computer 110 can identify solid lane markings on opposite sides of the host vehicle 105. The vehicle computer 110 can then identify the host lane 205 of host vehicle 105 operation based on a number of groups of dashed lane markings between each side of the host vehicle 105 and the respective solid lane marking. A solid lane marking is a marking extending continuously, i.e., is unbroken, along a length of a road and defining at least one boundary of a lane. A group of dashed lane markings includes a plurality of markings spaced from each other along a length of a road and defining at least one boundary of a lane. Additionally, the vehicle computer 110 can determine the target lane(s) 210 on each side of the host lane 205 based on the number of groups of dashed lane markings on each side of the host vehicle 105 (e.g., a number of target lanes is equal to the number of groups of dashed lane markings).

While operating in the host lane 205, the vehicle computer 110 can receive sensor 115 data, e.g., image data, of the environment around the host vehicle 105 in the host lane 205. The image data can include one or more vehicles traveling on the road 200 around the host vehicle 105. For example, object classification or identification techniques, can be used, e.g., in the vehicle computer 110 based on lidar sensor 115, camera sensor 115, etc., data to identify a type of object, e.g., a vehicle, a bicycle, an aerial drone, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the host vehicle 105 can be used to specify locations and/or areas (e.g., according to the host vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object as a vehicle, the vehicle computer 110 is programmed to identify the vehicle as a target vehicle 215. A "target" vehicle 215 is a vehicle detected by the host vehicle 105. The target vehicle 215 may operate forward of, rearward of, or next to the host vehicle 105. Forward of the host vehicle 105 means that a rearmost point of the target vehicle 215 is forward of a frontmost point of the host vehicle 105. Rearward of the host vehicle 105 means that a frontmost point of the target vehicle 215 is rearward of a rearmost point of the host vehicle 105. Next to the host vehicle 105 means any point of the target vehicle 215 is between the frontmost point and the rearmost point of the host vehicle 105. The vehicle computer 110 can detect one or more target vehicles 215 on the road 200. The target vehicles 215 may operate in a same or different lane 205, 210 as each other. The target vehicles 215 may operate in the host lane 205 or a target lane 210.

The vehicle computer 110 is programmed to determine a lane of operation for a target vehicle 215. For example, the vehicle computer 110 may determine the lane of operation of the target vehicle 215 by using image data to identify lane markings on each side of the target vehicle 215, e.g., according to image processing techniques, as discussed above. In such an example, the vehicle computer 110 can determine a target vehicle 215 is in the host lane 205 when the number of lanes on each side of the target vehicle 215 is the same as the number of lanes on the respective side of the host vehicle 105, or is in a target lane 210 when the number of lanes on each side of the target vehicle 215 is different than the number of lanes on the respective side of the host vehicle 105. As another example, the vehicle computer 110 may receive location data from the target vehicle 215, e.g., via V2V communications, specifying the lane of operation of the target vehicle 215.

The vehicle computer 110 may be programmed to determine an average longitudinal speed of a target vehicle 215 based on sensor 115 data. For example, the vehicle computer 110 can determine a longitudinal speed of the target vehicle 215 at multiple moments in time. The vehicle computer 110 can then determine an average longitudinal speed of the target vehicle 215 by summing the corresponding determined longitudinal speeds of the target vehicle 215 and dividing by a number of determined longitudinal speeds.

The vehicle computer 110 may determine a longitudinal speed of the target vehicle 215 relative to the host vehicle 105 by determining a change in distance between the target vehicle 215 and the host vehicle 105 over time. For example, the vehicle computer 110 determine the longitudinal speed of target vehicle 215 relative to the host vehicle 105 with the formula ΔD/ΔT, where ΔD is a difference between a pair of distances from the host vehicle 105 to the vehicle taken at different times and ΔT is an amount of time between when the pair of distances was determined. For example, the difference between the pair of distances ΔD may be determined by subtracting the distance determined earlier in time from the distance determined later in time. In such an example, a positive value indicates that the target vehicle 215 is traveling slower than the host vehicle 105, and a negative value indicates that the target vehicle 215 is traveling faster than the host vehicle 105. The vehicle computer 110 can then determine the longitudinal speed of the target vehicle 215 by combining, i.e., summing, the longitudinal speed of the target vehicle 215 relative to the host vehicle 105 to the longitudinal speed of the host vehicle 105 (e.g., determined based on sensor 115 data, such as wheel speed sensor data). As another example, the vehicle computer 110 may receive the longitudinal speed of the target vehicle 215, e.g., via V2V communications.

The vehicle computer 110 is programmed to determine a requested speed for the host vehicle 105. For example, the vehicle computer 110 can determine the requested speed based on a first user input. In such an example, the vehicle computer 110 may actuate the HMI 118 to detect the first user input selecting the requested speed for the host vehicle 105. For example, the HMI 118 may be actuated and/or instructed by the vehicle computer 110 to display virtual buttons on a touchscreen display that the user can select to specify the requested speed. In other words, the HMI 118 may activate sensors 115 that can detect the user selecting the virtual buttons to specify the requested speed. Upon detecting the first user input, the HMI 118 can provide the first user input to the vehicle computer 110, and the vehicle computer 110 can determine the requested speed for the host vehicle 105.

As another example, the vehicle computer 110 can determine the requested speed based on map data. In such an example, the vehicle computer 110 can access map data, e.g., stored in a memory of the vehicle computer 110. The vehicle computer can then determine the requested speed based on a speed specified by the map data, e.g., a speed limit, for the road 200.

Upon determining the requested speed, the vehicle computer 110 can operate the host vehicle 105 to satisfy the requested speed. That is, the vehicle computer 110 may be programmed to adjust a longitudinal acceleration α of the host vehicle 105 based on the requested speed, e.g., to maintain a speed of the host vehicle 105 less than or equal to the requested speed, subject to known collision avoidance techniques. The vehicle computer 110 can determine the longitudinal acceleration α of the host vehicle 105 with a model predictive control (MPC) algorithm. An MPC algorithm is an algorithm that minimizes the first cost function $J_T$ for the longitudinal acceleration α of the host vehicle 105 in the host lane 205 based on the host vehicle 105 speed and the requested speed. The first cost function $J_T$ is a quadratic cost for a deviation, i.e., difference, between the host vehicle 105 speed and the requested speed:

$$J_T = \sum_{i=0}^{N-1} \left( W_T \|v_H(k+i) - v_d\|_2^2 + W_U \|\alpha(k+i)\|_2^2 + W_\Delta \|\Delta\alpha(k+i)\|_2^2 \right) \quad (1)$$

where N is a prediction horizon, $v_H$ is the host vehicle 105 speed, $v_d$ is the requested speed, Δα is a longitudinal jerk, i.e., rate of change of longitudinal acceleration α over time, of the host vehicle 105, $W_T$, $W_U$, and $W_\Delta$ are adaptable weight values, e.g., determined based on empirical testing that allows for determining an average longitudinal acceleration and an average longitudinal jerk that are preferred, e.g., comfortable, for various vehicle occupants.

Upon minimizing the first cost function $J_T$ for the host vehicle 105 in the host lane 205, the vehicle computer 110 can operate the host vehicle 105 based on the determined longitudinal acceleration α. That is, the vehicle computer 110 can actuate one or more vehicle components 125 to satisfy the longitudinal acceleration α while operating the host vehicle 105 on the road 200 and avoiding impacts with a target vehicle 215.

To avoid impacting a target vehicle 215, the vehicle computer 110 is programmed to determine a virtual boundary 225 relative to the target vehicle 215 based on the speed of the target vehicle 215. In this context, a "virtual boundary" is a set of geo-coordinates representing a virtual (straight and/or curved) line extending across a lane 205, 210 transverse to the direction of travel of vehicles 105, 215 operating in the lane 205, 210. That is, the virtual boundary 225 is a line that the host vehicle 105 should not cross to avoid impacting the target vehicle 215. The vehicle computer 110 can determine a plurality of virtual boundaries 225 relative to the target vehicle 215. Thus, the vehicle computer 110 can avoid impacts with target vehicles 215 at different locations relative to the host vehicle 105.

The vehicle computer 110 can determine a rear virtual boundary 225a, i.e., a virtual boundary 225 extending rearward of the host vehicle 105. Thus, the rear virtual boundary 225a defines a boundary beyond which the host vehicle 105 should not cross to avoid impacting target vehicles 215. For example, when a target vehicle 215 is operating in the host lane 205, or the host vehicle 105 is moving into a target lane 210 in which the target vehicle 215 is operating, the host vehicle 105 should remain in front of the rear virtual boundary 225a. The vehicle computer 110 defines the virtual boundaries 225 according to virtual boundary equations, represented herein by the variable h. That is, an expression with a variable h outputs values that, in the coordinate system, define the virtual boundaries 225 beyond which the host vehicle 105 should not cross. In the Figures, the lines identified 225a and 225b are outputs of respective virtual boundary equations h defined below. The vehicle computer 110 can define a rear virtual boundary position $h_r$, a rear virtual boundary speed $\dot{h}_r$, and a rear virtual boundary acceleration $\ddot{h}_r$:

$$h_r = x_T - d_m - k_v v_T \quad (2)$$

$$\dot{h}_r = v_H - v_T \quad (3)$$

$$\ddot{h}_r = g\alpha \quad (4)$$

where $x_T$ is the x coordinate of a center of the target vehicle 215 relative to a center of the host vehicle 105, $v_T$ is a speed of the target vehicle 215, g is the acceleration constant due to gravity, α is the longitudinal acceleration of the host vehicle 105 in units of standard gravity, where 1 unit of standard gravity is the acceleration equivalent to the acceleration constant due to gravity (i.e., 1 "g" is acceleration equal to Earth's gravity, 2 "g's" is acceleration twice of Earth's gravity, etc.), $d_m$ is a predetermined minimum distance between the host vehicle 105 and the target vehicle 215, and $k_v$ is a time headway, i.e., an estimated time for the host vehicle 105 to reach the target vehicle 215 in the longitudinal direction. The time headway $k_v$ is a predetermined numerical value, e.g., 1. The time headway $k_v$ can be specified by a vehicle 105 and/or component 125 manufacturer, e.g., based on determining an additional distance to add to the predetermined minimum distance $d_m$ for given vehicle 105, 215 speeds $v_H$, $v_T$. The vehicle computer 110 can, for example, determine $x_T$ based on sensor 115 data. For example, the vehicle computer 110 can obtain sensor 115 data and analyze the sensor 115 data, e.g., according to known data processing techniques, to determine a distance from the host vehicle 105 to the target vehicle 215. The vehicle computer 110 can then determine $x_T$ from the distance. As another example, the vehicle computer 110 can determine $x_T$ by integrating the below equation with respect to time:

$$\dot{x}_T = v_T - v_H \tag{5}$$

The vehicle computer 110 can determine a front virtual boundary 225b, i.e., a virtual boundary 225 extending forward of the host vehicle 105. Thus, the front virtual boundary 225b defines a boundary beyond which the host vehicle 105 should not cross to avoid impacting target vehicles 215. For example, when a target vehicle 215 is operating in the host lane 205, or the host vehicle 105 is moving into a target lane 210 in which the target vehicle 215 is operating, the host vehicle 105 should remain behind the front virtual boundary 225b. The vehicle computer 110 can define a front virtual boundary position $h_f$ and a front virtual boundary speed $\dot{h}_f$:

$$h_f = -x_T - d_m - k_v v_H \tag{6}$$

$$\dot{h}_f = -gk_v\alpha + v_T - v_H \tag{7}$$

As set forth above, the vehicle computer 110 can detect one or more target vehicles 215 on the road 200. The vehicle computer 110 can determine a rear virtual boundary 225a for a target vehicle 215 rearward of the host vehicle 105, a front virtual boundary 225b for a target vehicle 215 forward of the host vehicle 105, and rear and front virtual boundaries 225a, 225b for a target vehicle 215 next to the host vehicle 105. The vehicle computer 110 can then determine updated virtual boundaries 225 for the target vehicles 215, e.g., according to the techniques discussed above, and/or delete virtual boundaries 225 for the target vehicles 215 as the host vehicle 105 moves relative to the target vehicles 215. Determining one virtual boundary 225 for target vehicles 215 either forward or rearward of the host vehicle 105 may conserve computational resources as compared to determining rear and front virtual boundaries 225a, 225b for each target vehicle 215.

The vehicle computer 110 is programmed to optimize a planned operation for the host vehicle 105. To optimize the planned operation, the vehicle computer 110 selects, for the host vehicle 105, a position relative to one or more target vehicles 215 in a lane 205, 210 that is outside the respective virtual boundaries 225 based on minimizing the first cost function and minimizing a lane change frequency. The position may be in front of a target vehicle 215, behind a target vehicle 215, or between target vehicles 215. Additionally, the position may be in a host lane 205 or a target lane 210.

The vehicle computer 110 selects the position relative to the target vehicle(s) 215 by using a mixed integer quadratic programming (MIQP) algorithm to minimize the first cost function and the second cost function subject to one or more constraint values determined by the virtual boundary equations (as discussed above). The MIQP algorithm minimizes the cost functions according to a "control objective," i.e., a set of conditions or constraints for which the MIQP algorithm optimizes the expressions. That is, the control objective defines the limits and/or constraints of the physical system that the expressions simulate.

The second cost function $J_L$ is a quadratic cost on changing lanes of operation for the host vehicle 105. The vehicle computer 110 can determine the second cost function $J_L$ based on determining whether a lane change operation is unspecified or specified. A lane change operation is unspecified when the vehicle computer 110 can select between operating the host vehicle 105 in the host lane 205 or a target lane 210, e.g., when operating the host vehicle 105 to negotiate traffic on the road 200. A lane change operation is specified when the vehicle computer 110 is constrained to move the host vehicle 105 to the target lane 210, e.g., to prepare to depart the road 200 based on a planned path for the host vehicle 105, to merge into a target lane 210 based on the host lane 205 terminating, etc. The vehicle computer 110 can maintain a look-up table, or the like, that associates various second cost functions $J_{L1}$, $J_{L2}$, $J_{L3}$ with corresponding lane change operations. Upon determining the lane change operation, the vehicle computer 110 can access the look-up table and select the second cost function $J_{L1}$, $J_{L2}$, $J_{L3}$ associated with the determined lane change operation.

The vehicle computer 110 can, for example, determine the lane change is specified based on a second user input. For example, the vehicle computer 110 can actuate the HMI 118 to display a virtual button that the user can select to specify the lane change. In other words, the HMI 118 can actuate one or more sensors 115 to detect the user selecting the virtual button specifying the lane change. Upon detecting the second user input, the HMI 118 can provide the user input to the vehicle computer 110, and the vehicle computer 110 can determine that the lane change is specified based on the second user input.

As another example, the vehicle computer 110 can determine the lane change is specified based on map data. For example, the vehicle computer 110 can determine a path for the host vehicle 105, e.g., according to known path planning algorithms. The vehicle computer 110 can then compare the path to map data, e.g., stored in a memory of the vehicle computer 110. Based on the map data, the vehicle computer 110 can, for example, determine a location at which the path transitions from a road 200 to another road. As another example, the vehicle computer 110 can determine a location at which the host lane 205 terminates. The vehicle computer 110 can determine the lane change is specified based on determining that the host vehicle 105 is within a threshold distance, e.g., determined based on the host vehicle 105 speed $v_H$, of the location. The vehicle computer 110 can determine the lane change is unspecified when the host vehicle 105 is outside of the threshold distance from the location.

Figure 3A:
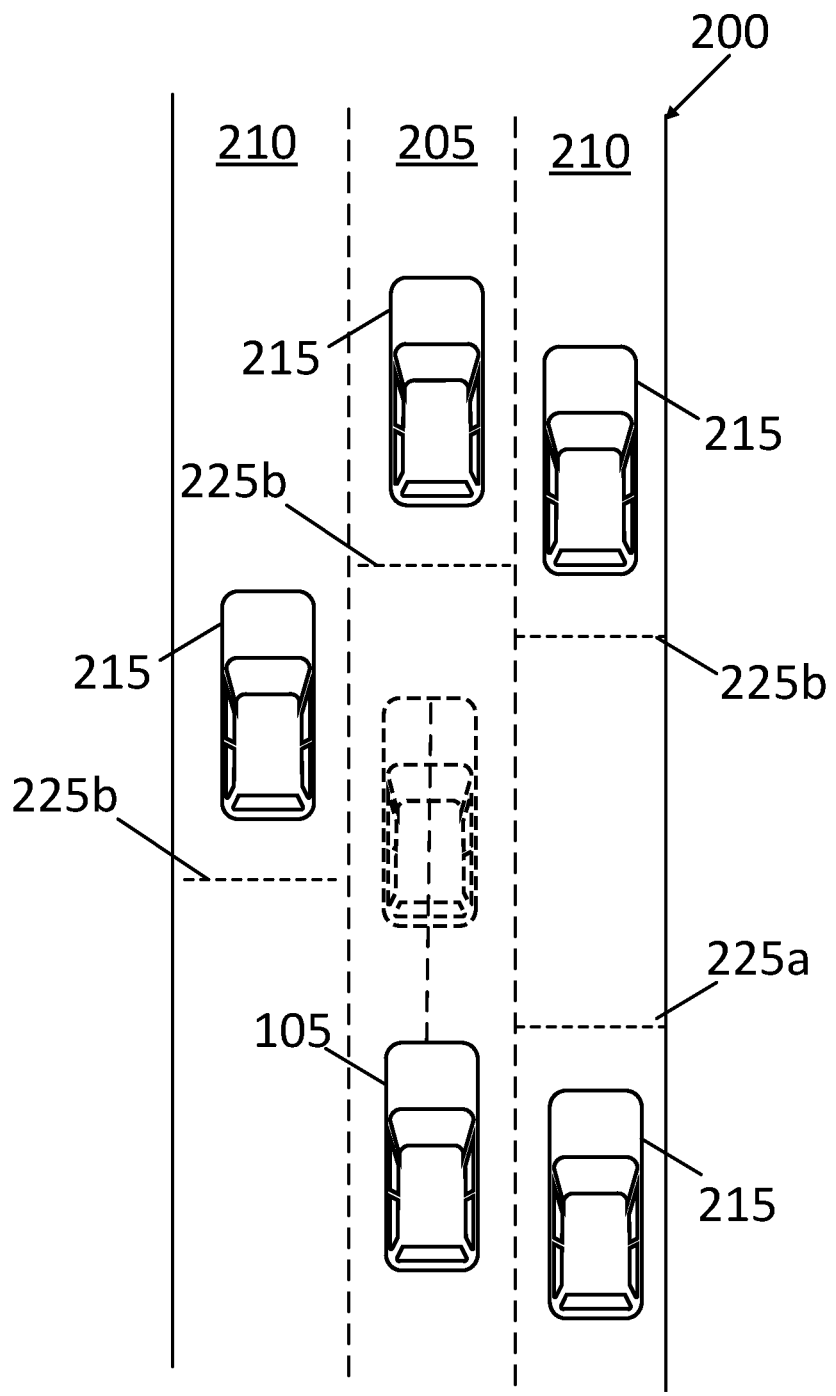
FIGS. 3A-3B are diagrams illustrating operating the host vehicle to negotiate traffic according to the system of FIG. 1.
Figure 3B:
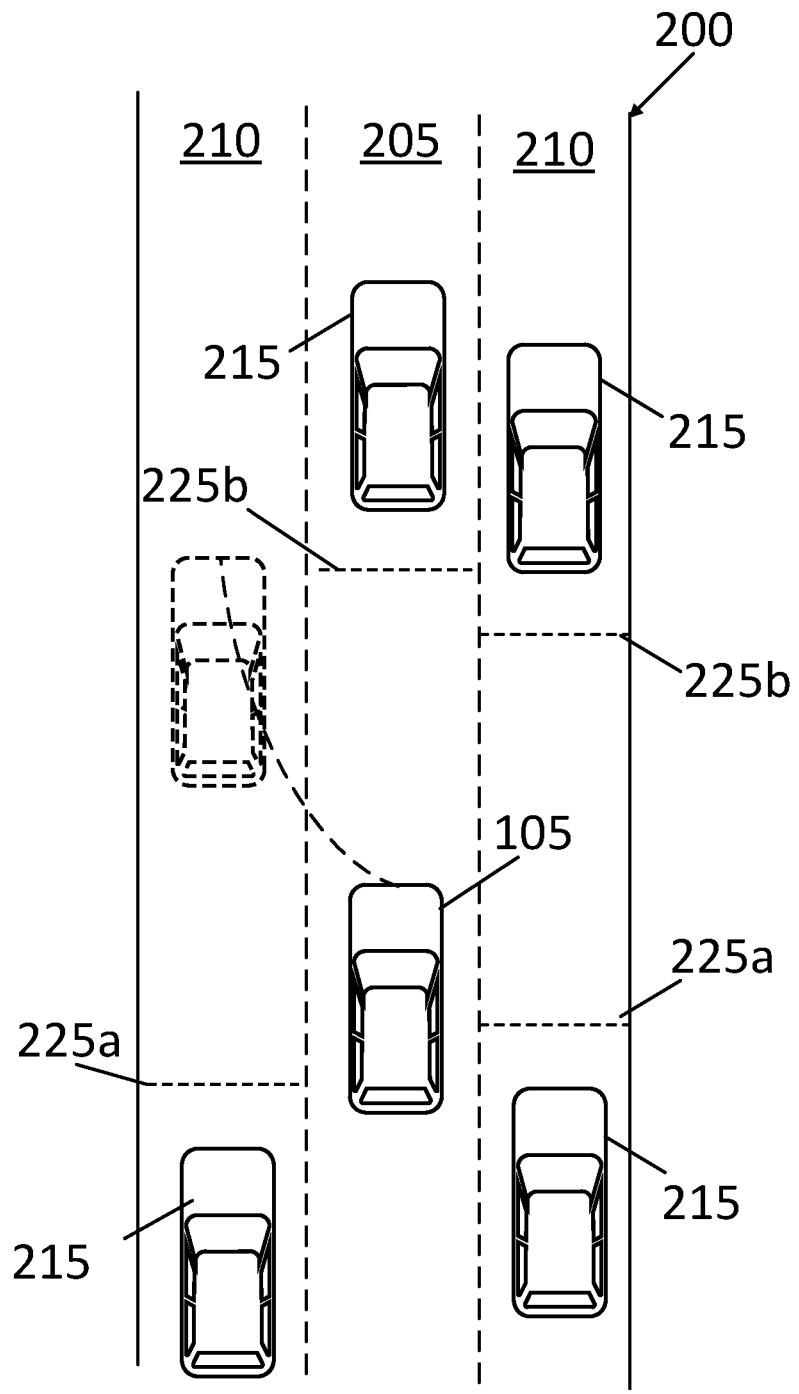

Turning now to FIGS. 3A-3B, upon determining the lane change is unspecified, the vehicle computer 110 can determine the position is in one of the host lane 205 or a target lane 210. To determine the position, the vehicle computer 110 determines the second cost function $J_{L1}$ as:

$$J_{L1} = H_{LC}(\Delta a_l^2 + \Delta a_c^2 + \Delta a_r^2) \tag{8}$$

where $\Delta a_i = a_i(k) - a_i(k-1)$, $H_{LC}$ is a weight on changing lanes, and $\Delta a_l$, $\Delta a_c$, and $\Delta a_r$ represent respective lanes on the road 200. $\Delta a_l$, $\Delta a_c$, and $\Delta a_r$ is equal to 1 when the corresponding lane is selected as the lane of operation for the host vehicle 105. $\Delta a_l$, $\Delta a_c$, and $\Delta a_r$ is equal to 0 when the corresponding lane is not selected as the lane of operation for the host vehicle 105. $H_{LC}$ is an exponential decay function, i.e., the weight on changing lanes decreases over time since a most recent previous lane change. $H_{LC}$ includes a weight parameter and a decay rate. The impact of the second cost function $J_{L1}$ is reduced over time since a most recent previous lane change by the decay rate reducing the weight parameter. The weight parameter and the decay rate may be determined empirically, e.g., based on testing that allows for determining various frequencies at which various vehicle occupants request a lane change. The subscript "l" refers to a first target lane 210, e.g., on a left side of the host lane 205, the subscript "c" refers to the host lane 205, and the subscript "r" refers to a second target lane 210, e.g., on a right side of the host lane 205.

The vehicle computer 110 can select an $H_LC$ based on a user input specifying a lane change frequency. For example, the vehicle computer 110 can actuate the HMI 118 to display a virtual button that the user can select to specify a lane change frequency. In other words, the HMI 118 can actuate one or more sensors 115 to detect the user selecting the virtual button specifying the lane change frequency. Upon detecting the user input, the HMI 118 can provide the user input to the vehicle computer 110, and the vehicle computer 110 can determine the lane change frequency based on the user input. Upon determining the lane change frequency, the vehicle computer 110 can select the $H_LC$ associated with the corresponding lane change frequency. For example, the vehicle computer 110 may include a look-up table that associates various $H_{LC}$s, e.g., weight parameters and decay rates, with corresponding lane change frequencies.

As used herein, a "lane change frequency" is a measure that the vehicle computer 110 can use to determine to change a lane of operation within a given time of a previous lane change and that indicates a user's preference for performing lane changes. The lane change frequency may be specified as a text string, e.g., "high", "medium", or "low". In this example, a lane change frequency of "high" represents a preference to perform more lane changes within the given time than a lane change frequency of "medium" or "low", and a lane change frequency of "low" represents a preference to perform fewer lane changes within the given time than a lane change frequency of "medium". For example, an $H_LC$ associated with a "high" lane change frequency may have a weight parameter that is greater than the weight parameters for $H_{LC}$s associated with "medium" or "low" lane change frequencies. Additionally, or alternatively, an $H_{LC}$ associated with a "high" lane change frequency may have a decay rate that is less than the decay rates for $H_{LC}$s associated with "medium" or "low" lane change frequencies.

Upon selecting the second cost function $J_{L1}$ associated with unspecified lane change, the vehicle computer 110 can solve the MIQP according to the control objective:

$$\min_{z, a_l, a_c, a_r} (J_{L1} + J_T) \tag{9}$$

subject to:

$$\dot{h}_{fl}(\alpha_{k+i}, k+i) + \lambda_f h_{fl}(k+i) + Ma_l \geq 0 \ i=0, \ldots, N-1 \tag{10}$$

$$\ddot{h}_{rl}(\alpha_{k+i}, k+i) + \lambda_1 \dot{h}_{rl}(k+i) + \lambda_0 h_{rl}(k+i) + Ma_l \geq 0 \ i=0, \ldots, N-1 \tag{11}$$

$$\dot{h}_{fc}(\alpha_{k+i}, k+i) + \lambda_f h_{fc}(k+i) + Ma_c \geq 0 \ i=0, \ldots, N-1 \tag{12}$$

$$\ddot{h}_{rc}(\alpha_{k+i}, k+i) + \lambda_1 \dot{h}_{rc}(k+i) + \lambda_0 h_{rc}(k+i) + Ma_c \geq 0 \ i=0, \ldots, N-1 \tag{13}$$

$$\dot{h}_{fr}(\alpha_{k+i}, k+i) + \lambda_f h_{fr}(k+i) + Ma_r \geq 0 \ i=0, \ldots, N-1 \tag{14}$$

$$\ddot{h}_{rr}(\alpha_{k+i}, k+i) + \lambda_1 \dot{h}_{rr}(k+i) + \lambda_0 h_{rr}(k+i) + Ma_r \geq 0 \ i=0, \ldots, N-1 \tag{15}$$

$$\alpha_{min} \leq \alpha_{k+i} \leq \alpha_{max} \ i=0, \ldots, N-1 \tag{16}$$

$$\Delta\alpha_{min} \leq \Delta\alpha_{k+i} \leq \Delta\alpha_{max} \ i=0, \ldots, N-1 \tag{17}$$

$$a_l + a_c + a_r = 2 \tag{18}$$

where $a_l$, $a_c$, $a_r$ are binary values taking values of either 0 or 1 such that $a_l=0$ when the first target lane 210 is selected, $a_c=0$ when the host lane 205 is selected, and $a_r=0$ when the second target lane 210 is selected, $\alpha_{k+i} = \alpha(k+i)$, $z = [\alpha(k) \ \alpha(k+1) \ \ldots \ \alpha(k+N-1)]^T$, and M is a large number selected by the manufacturer during testing such that the inequalities in the expressions above remain true, that is, constraint inactive, when $a_l$, $a_c$, $a_r$ are nonzero. $\lambda_f$ is a first predetermined decay constant, e.g., determined based on empirical testing of virtual vehicles in a simulation model, such as Simulink. $\lambda_0$ and $\lambda_1$ are functions of two second predetermined decay constants, e.g., determined based on empirical testing of virtual vehicles in a simulation model, such as Simulink. $\lambda_0$ is a product of the two second predetermined decay constants, and $\lambda_1$ is a sum of the two second predetermined decay constants. The subscript "fl" refers to a front virtual boundary 225b in the first target lane 210, the subscript "fr" refers to a front virtual boundary 225b in the second target lane 210, subscript "rl" refers to a rear virtual boundary 225a in the first target lane 210, subscript "rr" refers to a rear virtual boundary 225a in the second target lane 210, subscript "fc" refers to a front virtual boundary 225b in the host lane 205, subscript "rc" refers to a rear virtual boundary 225a in the host lane 205, and the subscript "f" refers to the decay constant for a front virtual boundary 225b.

By solving the MIQP algorithm with a conventional MIQP algorithm solver, the vehicle computer 110 can determine, relative to the target vehicles 215, a position in a lane 205, 210 that allows the host vehicle 105 to negotiate traffic while avoiding impacting target vehicles 215 and minimizing deviation between the host vehicle 105 speed $v_H$ and the requested speed $v_d$. That is, the vehicle computer 110 can determine whether to remain in a host lane 205 (see FIG. 3A) or move to a target lane 210 (see FIG. 3B) to optimize operation of the host vehicle 105 along the road 200. For example, the vehicle computer 110 can determine the position is in the host lane 205 based on the first and second cost functions $J_T$, $J_{L1}$ being minimized for the host lane 205.

Alternatively, the vehicle computer 110 can determine the position is in a target lane 210 based on the first and second cost functions $J_T$, $J_{L1}$ being minimized for the target lane 210.

Figure 4A:
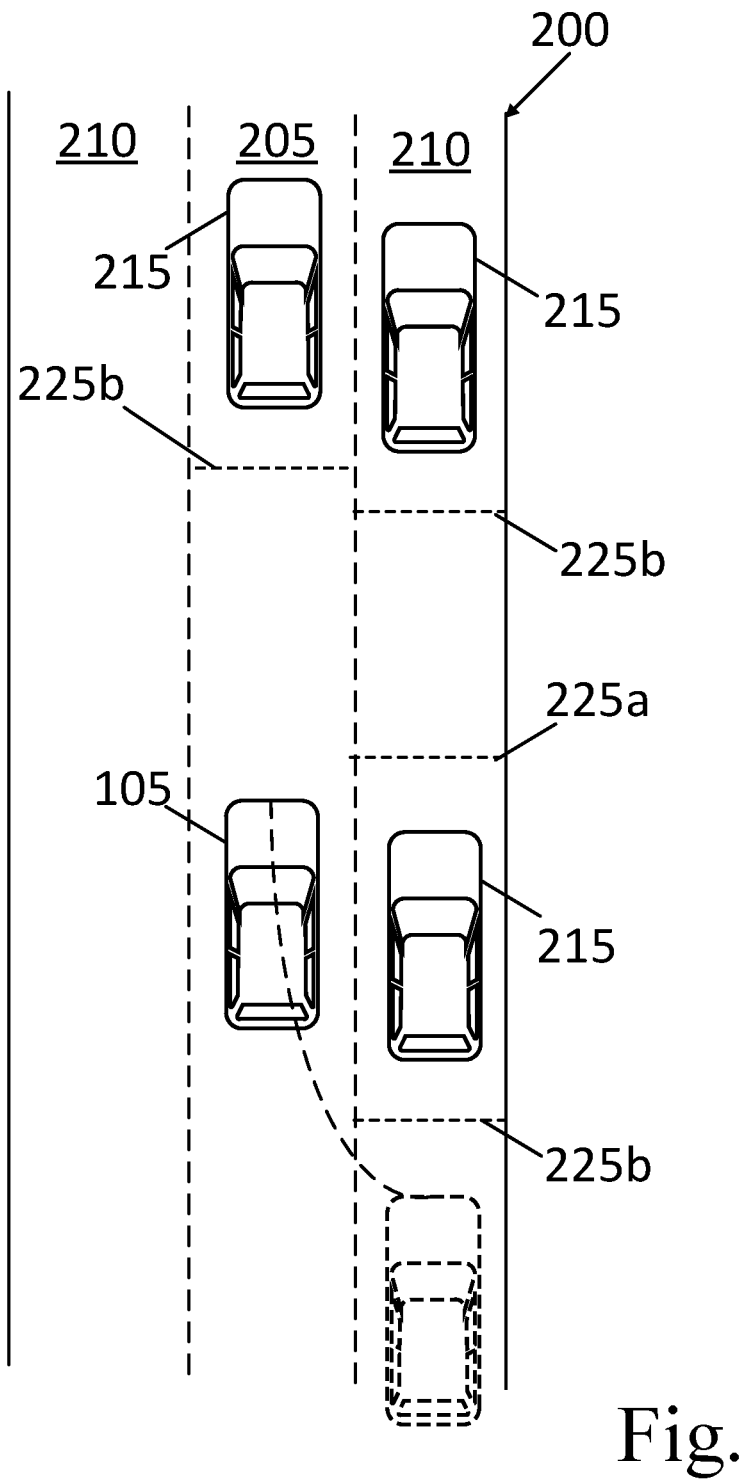
FIGS. 4A-4B are diagrams illustrating operating the host vehicle to perform a specified lane change according to the system of FIG. 1.
Figure 4B:
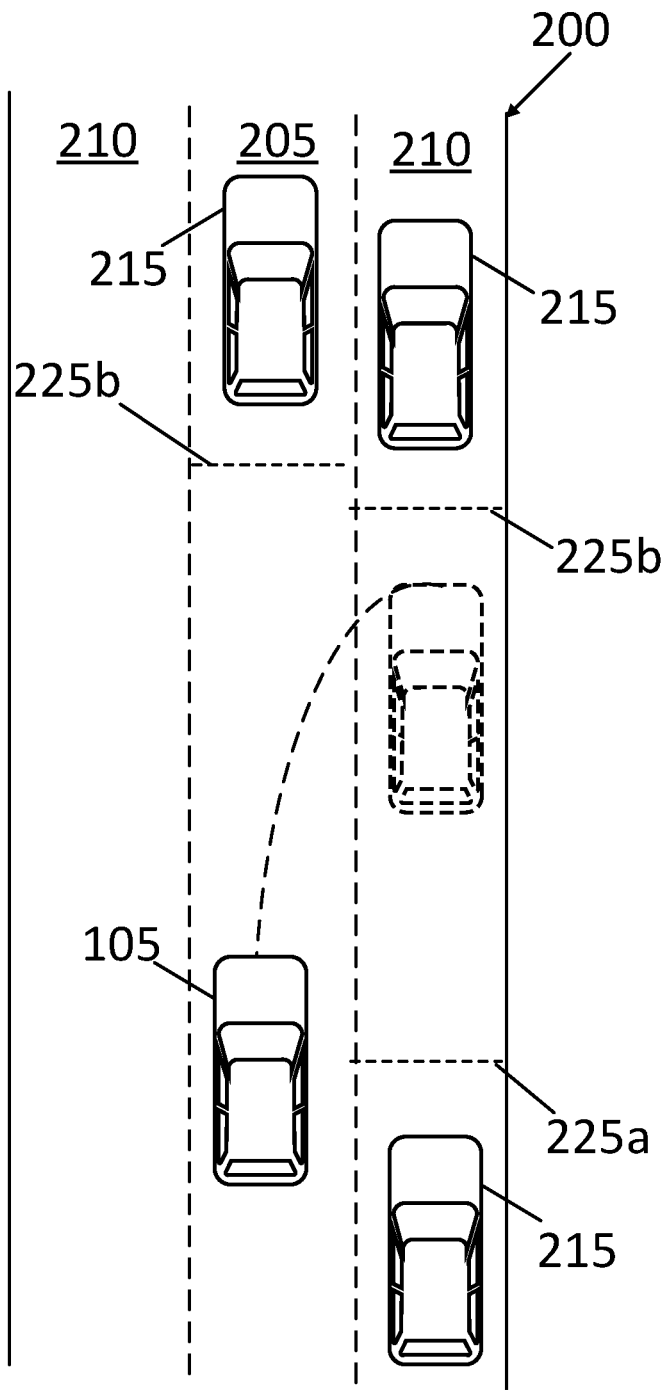

Turning now to FIGS. 4A-4B, upon determining the lane change is specified, the vehicle computer 110 can identify one or more target vehicles 215 in the specified target lane 210, as discussed above. In a situation in which the host lane 205 and the target lane 210 are both through lanes, the vehicle computer 110 can then determine a position that is in the target lane 210 and one of a rearward position behind the target vehicle 215 or a forward position in front of the target vehicle 215. In this situation, to determine the position for the host vehicle 105, the vehicle computer 110 determines the second cost function $J_{L2}$ is:

$$J_{L2} = H_s \sum_{t=0}^{t=N-1} \left(s_{1ft}^2(i) + s_{2rt}^2(i) + s_{2ft}^2(i)\right) + H_{\Delta a}(\Delta a_1 + \Delta a_2) \quad (19)$$

where s are slack variables associated with the target vehicle(s) 215, $H_s$ is a weight on the slack variables, $H_{\Delta a}$ is a weight on selecting the forward or rearward position. $H_{\Delta a}$ is determined based on the user input specifying the lane change frequency, e.g., in substantially the same manner as discussed above regarding determining $H_{LC}$. Typically, $H_{\Delta a}$ is greater than $H_{LC}$. $H_s$ is an arbitrary number selected by the manufacturer during testing. The subscript "1ft" refers to a front virtual boundary 225b for a target vehicle 215 in the target lane 210 and in front of the host vehicle 105 when the rearward position is selected, the subscript "2rt" refers to a rear virtual boundary 225a for a target vehicle 215 in the target lane 210 and behind the host vehicle 105 when the forward position is selected, the subscript "2 ft" refers to a front virtual boundary 225b for a target vehicle 215 in the target lane 210 and in front of the host vehicle 105 when the forward position is selected.

Slack variables are variables that prevent violation of one or more of the constraint values when a steering angle (as discussed below) would otherwise be unable to prevent the violation. The vehicle computer 110 can be programmed to prevent a lane change based on at least one of the slack variables being greater than a threshold, i.e., while the constraints are being violated. The threshold may be stored, e.g., in a memory of the vehicle computer 110. The threshold may be determined empirically, e.g., based on testing that allows for determining a value for slack variables below which a likelihood of violation of the constrain value(s) is minimized. Upon determining the slack variables according to the control objective discussed below, the vehicle computer 110 can compare the slack variables to the threshold. If at least one of the slack variables is greater than the threshold, then the vehicle computer 110 can determine to maintain the host vehicle 105 in the host lane 205, i.e., the vehicle computer 110 can prevent the host vehicle 105 from moving into a target lane 210. If the slack variables are less than or equal to the threshold, then the vehicle computer 110 can permit the host vehicle 105 to move into a target lane 210.

Upon selecting the second cost function $J_{L2}$ associated with the specified lane change from a host through lane 205 to a target through lane 210, the vehicle computer 110 can solve the MIQP according to the control objective:

$$\min_{z, s_{1ft}, s_{2rt}, s_{2ft}, a_1, a_2} (J_{L2} + J_T) \quad (20)$$

subject to:

$$\dot{h}_{1ft}(\alpha_{k+i}, k+i) + \lambda_0 h_{1ft}(k+i) + Ma_1 + s_{1ft}(i) \geq 0 \\ i=0, \ldots, N-1 \quad (21)$$

$$\dot{h}_{2fc}(\alpha_{k+i}, k+i) + \lambda_0 h_{2fc}(k+i) + Ma_2 \geq 0 \; i=0, \ldots, N-1 \quad (22)$$

$$\ddot{h}_{2rt}(\alpha_{k+i}, k+i) + \lambda_1 \dot{h}_{2rt}(k+i) + \lambda_0 h_{2rt}(k+i) + Ma_2 + s_{2rt}(i) \geq 0 \\ i=0, \ldots, N-1 \quad (23)$$

$$\dot{h}_{2ft}(\alpha_{k+i}, k+i) + \lambda_0 h_{2ft}(k+i) + Ma_2 + s_{2ft}(i) \geq 0 \\ i=0, \ldots, N-1 \quad (24)$$

$$\alpha_{min} \leq \alpha_{k+i} \leq \alpha_{max} \; i=0, \ldots, N-1 \quad (25)$$

$$\Delta\alpha_{min} \leq \Delta\alpha_{k+i} \leq \Delta\alpha_{max} \; i=0, \ldots, N-1 \quad (26)$$

$$a_1 + a_2 = 1 \quad (27)$$

where $a_1$, $a_2$ are binary values taking values of either 0 or 1 such that $a_1=0$ when the forward position is selected, $a_2=0$ when the rearward position is selected, and the subscript "2fc" refers to a front virtual boundary 225b for a target vehicle 215 in the host lane 205 and in front of the host vehicle 105 when the forward position is selected.

By solving the MIQP algorithm with a conventional MIQP algorithm solver, the vehicle computer 110 can determine a position in the target lane 210 relative to the target vehicle 215 that allows the vehicle computer 110 to enter the target lane 210 while avoiding target vehicles 215 and minimizing deviation from the requested speed $v_d$. That is, the vehicle computer 110 can determine whether to move the host vehicle 105 behind (see FIG. 4A) or in front of a target vehicle 215 (see FIG. 4B) in a target lane 210 to optimize operation of the host vehicle 105 along the road 200.

Figure 5A:
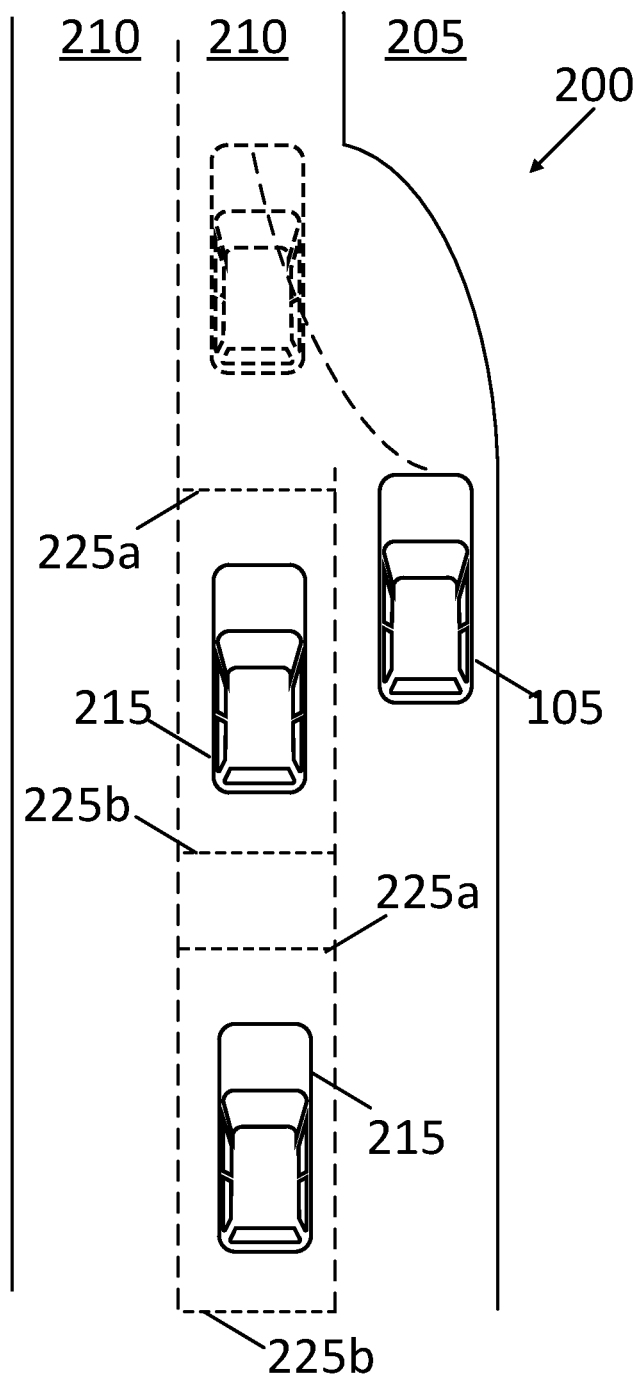
FIGS. 5A-5C are diagrams illustrating operating the host vehicle to merge into a target lane according to the system of FIG. 1.
Figure 5B:
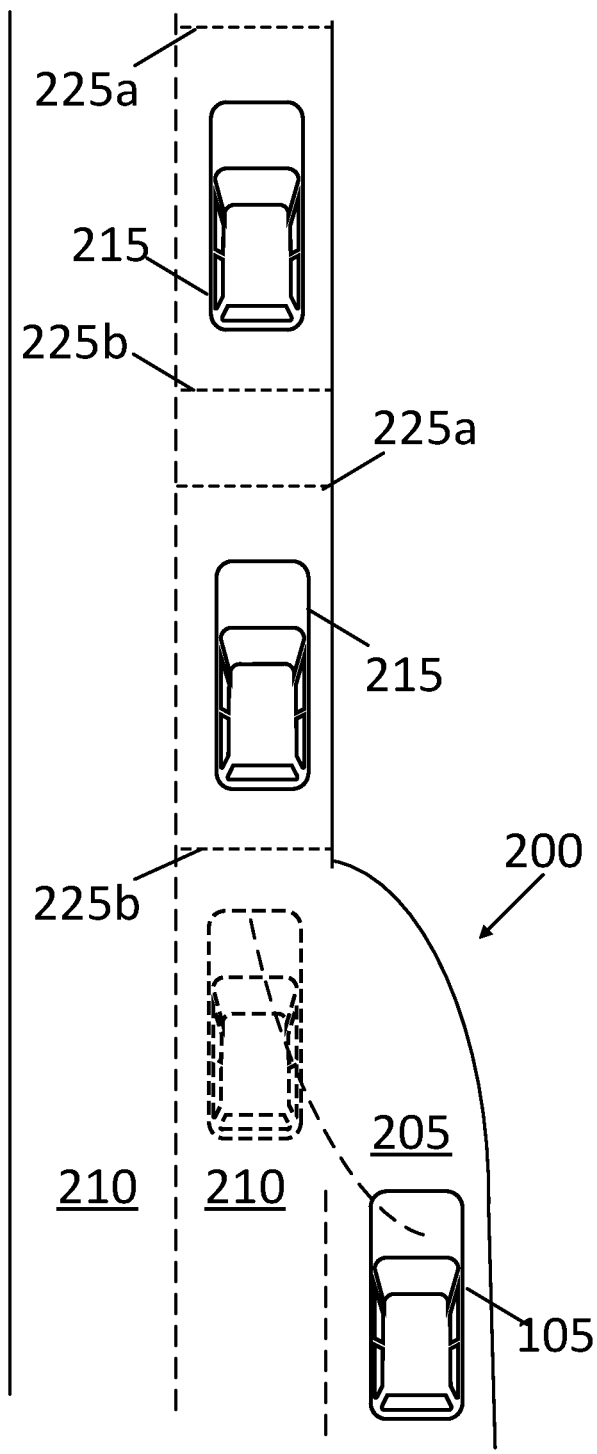
Figure 5C:
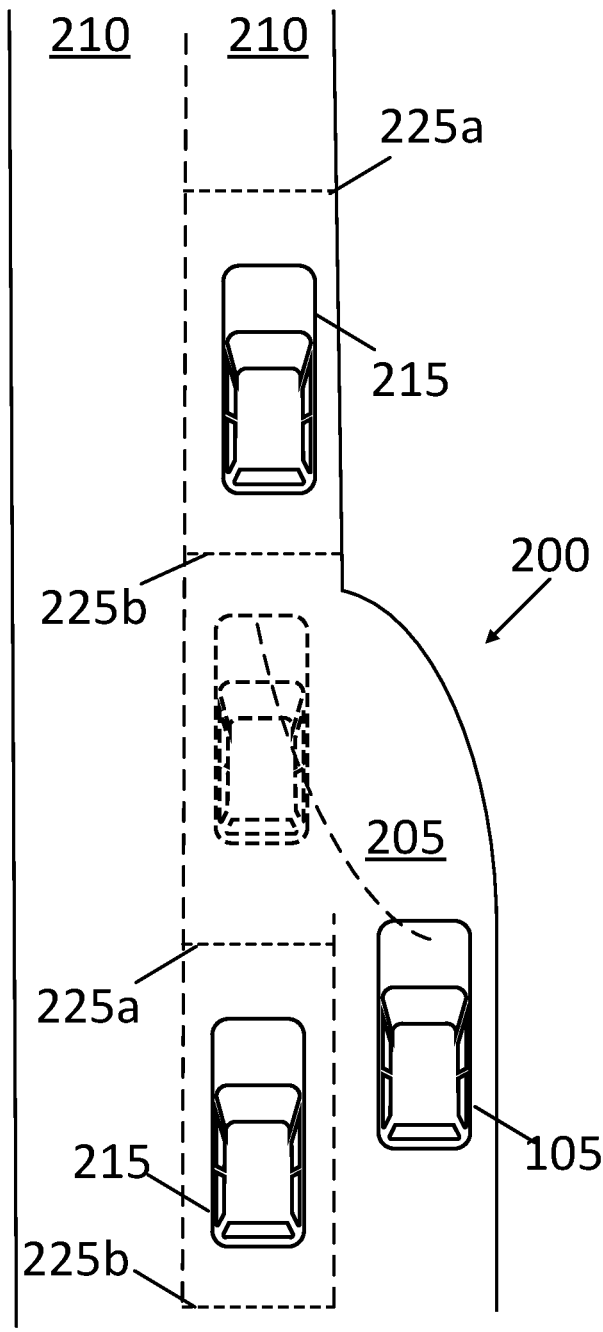

Turning now to FIGS. 5A-5C, upon determining the lane change is specified, the vehicle computer 110 can identify one or more, e.g., two, target vehicles 215 in the specified target lane 210, as discussed above. In a situation in which the host lane 205 terminates, i.e., is not a through lane, the vehicle computer 110 can determine a position that is in the target lane 210 and one of a first position in front of two target vehicles 215, a second position between the target vehicles 215, or a third position behind the two target vehicles 215. In this situation, to determine the optimized lane of operation, the vehicle computer 110 determines the second cost function $k_3$ is:

$$J_{L3} = H_s \sum_{t=0}^{t=N-1} \left(s_b^2(i) + s_{cf}^2(i) + s_{cr}^2(i) + s_d^2(i)\right) + H_{\Delta a}(\Delta a_x + \Delta a_y + \Delta a_z) \quad (28)$$

where the subscript "b" refers to rear virtual boundary 225a for a target vehicle 215 in the target lane 210 and in front of the host vehicle 105, the subscript "cf" refers to front virtual boundary 225b for a target vehicle 215 in the target lane 210 and behind the host vehicle 105, the subscript "cr" refers to rear virtual boundary 225a for a target vehicle 215 in the target lane 210 and in front of the host vehicle 105, the subscript "d" refers to front virtual boundary 225b for a target vehicle 215 in the target lane 210 and behind the host vehicle 105.

Upon selecting the second cost function $A_3$ associated with operating the host vehicle 105 to merge into a target lane 210, the vehicle computer 110 can solve the MIQP according to the control objective:

$$\min_{z, s_b, s_{cf}, s_{cr}, s_d, a_x, a_y, a_z} (J_{L3} + J_T) \qquad (29)$$

subject to:

$$\ddot{h}_b(\alpha_{k+i}, k+i) + \lambda_1 \dot{h}_b(k+i) + \lambda_0 h_b(k+i) + Ma_x + s_b \geq 0 \\ i=0, \ldots, N-1 \qquad (30)$$

$$h_{cf}(\alpha_{k+i}, k+i) + \lambda_0 h_{cf}(k+i) + Ma_y + s_{cf}(i) \geq 0 \; i=0, \ldots, N-1 \qquad (31)$$

$$\ddot{h}_{cr}(\alpha_{k+i}, k+i) + \lambda_1 \dot{h}_{cr}(k+i) + \lambda_0 h_{cr}(k+i) + Ma_y + s_{cr} \geq 0 \\ i=0, \ldots, N-1 \qquad (32)$$

$$\dot{h}_d(\alpha_{k+i}, k+i) + \lambda_0 h_d(k+i) + Ma_z + s_d(i) \geq 0 \; i=0, \ldots, N-1 \qquad (33)$$

$$\alpha_{min} \leq \alpha_{k+i} \leq \alpha_{max} \; i=0, \ldots, N-1 \qquad (34)$$

$$\Delta\alpha_{min} \leq \Delta\alpha_{k+i} \leq \Delta\alpha_{max} \; i=0, \ldots, N-1 \qquad (35)$$

$$a_x + a_y + a_z = 2 \qquad (36)$$

where $a_x$, $a_y$, $a_z$ are binary values taking values of either 0 or 1 such that $a_x=0$ when the first position is selected, $a_y=0$ when the second position is selected, $a_z=0$ when the third position is selected.

By solving the MIQP algorithm with a conventional MIQP algorithm solver, the vehicle computer 110 can determine a position in the target lane 210 relative to the target vehicles 215 at which the host vehicle 105 can enter the target lane 210 while avoiding target vehicles 215 and minimizing deviation from the requested speed $v_d$. That is, the vehicle computer 110 can determine whether to merge behind both target vehicles 215 (see FIG. 5A), in front of both target vehicles 215 (see FIG. 5B), or between the target vehicles 215 (see FIG. 5C) to optimize operation of the host vehicle 105 along the road 200.

Upon determining that the position is in the host lane 205 (see FIG. 3A), the vehicle computer 110 can actuate one of a brake component 125 or a propulsion component 125 to operate the host vehicle 105 to the position in the host lane 205 while avoiding impacting the target vehicle(s) 215, if any, in the host lane 205. Additionally, the vehicle computer 110 can actuate a steering component 125 to maintain the host vehicle 105 in the host lane 205. For example, the vehicle computer 110 can determine a steering angle (as discussed below) to operate the host vehicle 105 such that the host vehicle 105 is substantially centered within the host lane 205.

Upon determining that the position is in a target lane 210 (see FIGS. 3B-5C), the vehicle computer 110 can actuate at least one of the brake component 125 or the propulsion component 125 based on the position relative to the target vehicle(s) 215 in the target lane 210. For example, upon determining that the position is forward of a target vehicle 215 in the target lane 210 and the target vehicle 215 is forward of or next to the host vehicle 105, the vehicle computer 110 can actuate the propulsion component 125 to move the host vehicle 105 to the position in front of the target vehicle 215. As another example, upon determining that the position is rearward of a target vehicle 215 in the target lane 210 and the target vehicle 215 is rearward of or next to the host vehicle 105, the vehicle computer 110 can actuate the brake component 125 to move the host vehicle 105 to the position behind the target vehicle 215. As another example, upon determining that the position is between two target vehicles 215, the vehicle computer 110 can actuate the brake component 125 or the propulsion component 125, e.g., sequentially, to move the host vehicle 105 to the position between the target vehicles 215.

Additionally, the vehicle computer 110 can actuate the steering component 125 to move the host vehicle 105 from the host lane 205 to the target lane 210. For example, the vehicle computer 110 can determine a steering angle to operate the host vehicle 105 such that the host vehicle 105 moves from the host lane 205 to the target lane 210.

The vehicle computer 110 can determine a steering angle to operate the vehicle based on a state feedback controller:

$$\delta = \arctan(L(\kappa + K_1(y - y_d) + K_2 \Phi)) \qquad (37)$$

where L is a wheelbase of the host vehicle 105, i.e., a length along a longitudinal axis of the host vehicle 105 from a front axle to a rear axle, K is a curvature of the road 200, e.g., determined based on map data, y is a lateral position, e.g., geo-coordinates, of the host vehicle 105, e.g., determined based on obtaining location data via one or more sensors 115, $y_d$ is a desired lateral position, e.g., geo-coordinates, of the host vehicle 105, e.g., determined based on location data, e.g., specified in map data, of a centerline for the determined lane 205, 210 of operation, P is an orientation of the longitudinal axis of the host vehicle 105 relative to a longitudinal axis of the road 200, and $K_1$ and $K_2$ are gains given by:

$$K_1 = \frac{16}{(\zeta T v_h)^2} \qquad (38)$$

$$K_2 = \frac{8}{T v_h} \qquad (39)$$

where T is a time taken to complete a lane change and $\zeta$ is a tuning parameter. T and $\zeta$ may be determined empirically, e.g., based on testing that allows for determining preferred, e.g., comfortable, lateral control of a vehicle for various occupants.

Figure 6:
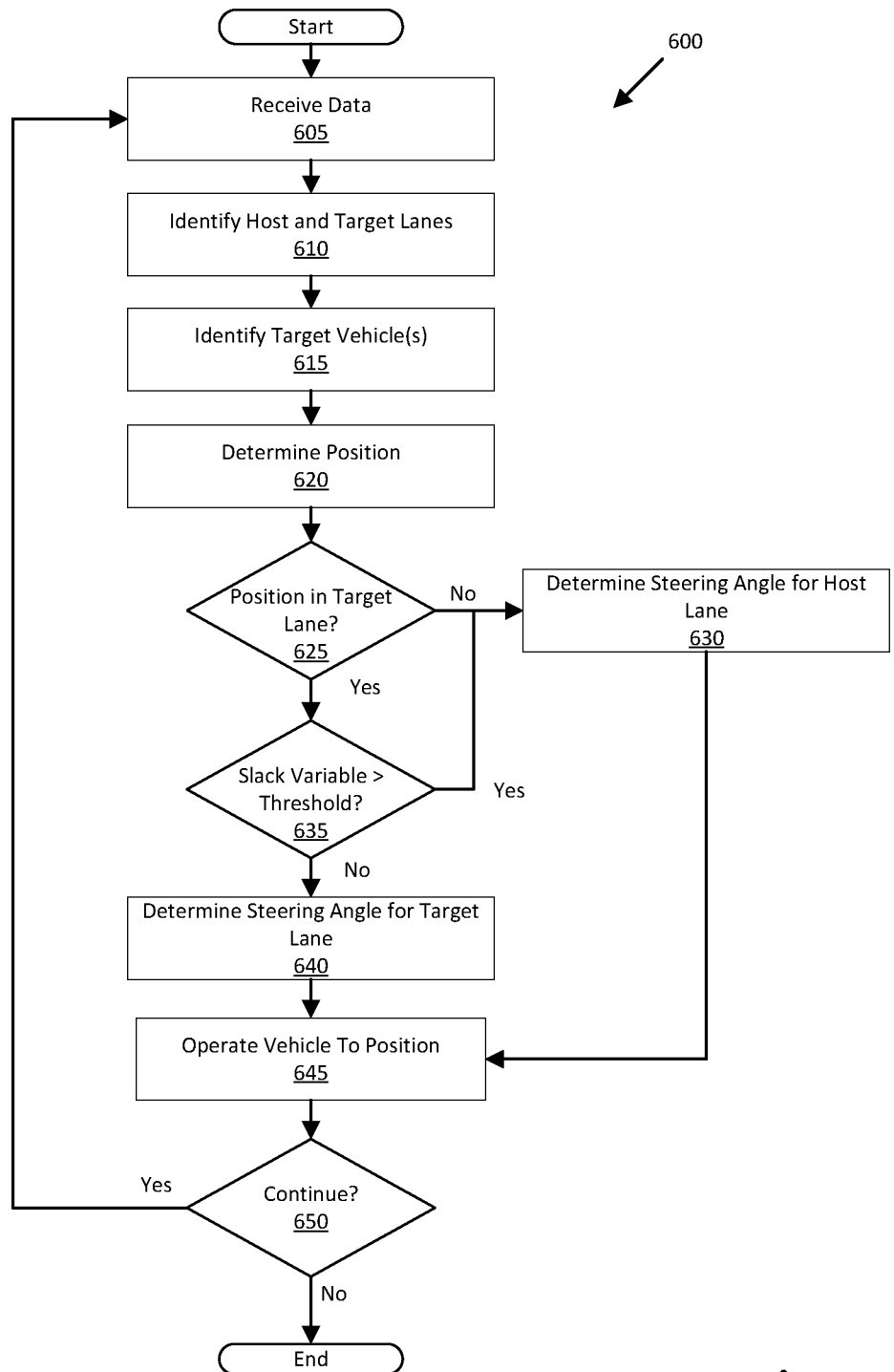
FIG. 6 is a flowchart of an example process for operating the host vehicle.

FIG. 6 is a diagram of an example process 600 executed in a vehicle computer 110 according to program instructions stored in a memory thereof for optimizing a planned operation of a host vehicle 105. Process 600 includes multiple blocks that can be executed in the illustrated order. Process 600 could alternatively or additionally include fewer blocks or can include the blocks executed in different orders.

The process 600 begins in a block 605. In the block 605, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive image data, e.g., from one or more image sensors 115. The image data may include data about the environment around the host vehicle 105, e.g., a target vehicle 215 operating on the road 200, lane markings, etc. Additionally, the vehicle computer 110 can receive sensor 115 data from the HMI 118 including data about the first user input specifying a requested speed $v_d$. The process 600 continues in a block 610.

In the block 610, the vehicle computer 110 identifies a host lane 205 and one or more target lanes 210 on a road 200 based on the sensor 115 data obtained in the block 605, as discussed above. The process 600 continues in a block 615.

In the block 615, the vehicle computer 110 identifies one or more target vehicles 215 on the road 200 based on the sensor 115 data obtained in the block 605, as discussed above. Additionally, the vehicle computer 110 can determine virtual boundaries 225 for the target vehicles 215, as discussed above. The process 600 continues in a block 620.

In the block 620, the vehicle computer 110 determines a position for the host vehicle 105 relative to the target vehicles 215 by minimizing a first cost function $J_T$ for a deviation of a host vehicle speed from a requested speed and a second cost function $J_L$ for a frequency of lane changes subject to the virtual boundaries 225, e.g., using an MIQP solver, as discussed above. The process 600 continues in a block 625.

In the block 625, the vehicle computer 110 determines whether the position is in a host lane 205 or a target lane 210. The vehicle computer 110 can determine the position is in the target lane 210 based on determining a lane change operation is specified, e.g., based on a second user input or map data, or determining the first and second cost functions $J_T$, $J_L$ are minimized for the target lane 210, as discussed above. The vehicle computer 110 can determine the position is in the host lane 205 based on determining the first and second cost functions $J_T$, $J_L$ are minimized for the host lane 205, as discussed above. If the vehicle computer 110 determines the position is in the target lane 210, then the process 600 continues in a block 635. Otherwise, the process 600 continues in a block 630.

In the block 630, the vehicle computer 110 determines a steering angle to maintain the host vehicle 105 in the host lane 205, as discussed above. The process 600 continues in a block 645.

In the block 635, the vehicle computer 110 determines whether at least one slack variable s is greater than a threshold. The vehicle computer 110 can determine one or more slack variables by solving the MIQP, as discussed above. The vehicle computer 110 can then compare the determined slack variables to the threshold. If at least one of the slack variables are greater than the threshold, then the process 600 returns to the block 630. Otherwise, the process 600 continues in the block 640.

In the block 640, the vehicle computer 110 determines a steering angle to move the host vehicle 105 to the target lane 210, as discussed above. The process 600 continues in a block 645.

In the block 645, the vehicle computer 110 operates the host vehicle 105 to the position. The vehicle computer 110 can actuate at least one of a propulsion component 125, a brake component 125, and a steering component 125 to move the host vehicle 105 to the position, e.g., based on the position and the position(s) of the target vehicle(s) 215 relative to the host vehicle 105, as discussed above. The process 600 continues in a block 650.

In the block 650, the vehicle computer 110 determines whether to continue the process 600. For example, the vehicle computer 110 can determine to continue upon detecting another target vehicle 215. In another example, the vehicle computer 110 can determine not to continue when the host vehicle 105 is powered off. If the vehicle computer 110 determines to continue, the process 600 returns to the block 605. Otherwise, the process 600 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   determine, relative to a host vehicle in a host lane of operation, a speed of a target vehicle in a target lane of operation;
   determine a virtual boundary between the host vehicle and the target vehicle based on the speed of the target vehicle;
   select, relative to the target vehicle, a position in the target lane and outside the virtual boundary based on a) a first cost function for a deviation of a speed of the host vehicle from a requested speed, and b) a second cost function for a frequency of lane changes, the second cost function based on a time since a most recent lane change; and
   upon determining to move the host vehicle from the host lane to the target lane, operate the host vehicle to the position in the target lane;
   wherein the second cost function includes a weight parameter and a decay rate reducing the weight parameter over time.

2. The system of claim 1, wherein the instructions further include instructions to determine the requested speed based on map data.

3. The system of claim 1, wherein the instructions further include instructions to determine the requested speed based on a user input.

4. The system of claim 1, wherein the instructions further include instructions to determine the weight parameter based on a user input.

5. The system of claim 1, wherein the instructions further include instructions to determine a longitudinal acceleration for the host vehicle based on the first cost function.

6. The system of claim 1, wherein the instructions further include instructions to, upon determining the first and second cost functions are minimized for the target lane, determine a steering angle for the host vehicle to move the host vehicle to the position in the target lane.

7. The system of claim 6, wherein the second cost function includes slack variables for the target vehicle to prevent violation of the virtual boundaries by the steering angle.

8. The system of claim 7, wherein the instructions further include instructions to prevent the host vehicle from operating into the target lane based on at least one slack variable being greater than a threshold.

9. The system of claim 1, wherein the instructions further include instructions to, based on detecting the target vehicle is in front of or next to the host vehicle relative to a direction of travel of the host vehicle, actuate a propulsion component and a steering component to operate the host vehicle to the position upon determining the position is in front of the target vehicle.

10. The system of claim 1, wherein the instructions further include instructions to, based on detecting the target vehicle is behind or next to the host vehicle relative to a direction of travel of the host vehicle, actuate a brake component and a steering component to operate the host vehicle to the position upon determining the position is behind the target vehicle.

11. The system of claim 1, wherein the instructions further include instructions to:
   determine, relative to the host vehicle, a speed of a second target vehicle in the target lane;
   determine a second virtual boundary for the second target vehicle based on the speed of the second target vehicle; and
   select the position in the target lane based additionally on the second virtual boundary.

12. The system of claim 11, wherein the position is between the target vehicle and the second target vehicle, and wherein the instructions further include instructions to actuate a steering component and at least one of a propulsion component or a brake component to operate the host vehicle to the position based on determining, relative to the host vehicle, respective positions of the target vehicle and the second target vehicle.

13. The system of claim 1, wherein the instructions further include instructions to determine to move the host vehicle to the target lane based on a user input.

14. The system of claim 1, wherein the instructions further include instructions to determine to move the host vehicle to the target lane based on determining the first and second cost functions are minimized for the target lane.

15. The system of claim 1, wherein the instructions further include instructions to determine to maintain the host vehicle in the host lane based on determining the first and second cost functions are minimized for the host lane.

16. The system of claim 1, wherein the decay rate reduces the weight parameter over time starting at the time since the most recent lane change.

17. A method, comprising:
  determining, relative to a host vehicle in a host lane of operation, a speed of a target vehicle in a target lane of operation;
  determining a virtual boundary between the host vehicle and the target vehicle based on the speed of the target vehicle;
  selecting, relative to the target vehicle, a position in the target lane and outside the virtual boundary based on a) a first cost function for a deviation of a speed of the host vehicle from a requested speed, and b) a second cost function for a frequency of lane changes, the second cost function based on a time since a most recent lane change; and
  upon determining to move the host vehicle from the host lane to the target lane, operating the host vehicle to the position in the target lane;
  wherein the second cost function includes a weight parameter and a decay rate reducing the weight parameter over time.

18. The method of claim 17, further comprising determining to move the host vehicle to the target lane based on determining the first and second cost functions are minimized for the target lane.

19. The method of claim 17, further comprising determining to maintain the host vehicle in the host lane based on determining the first and second cost functions are minimized for the host lane.

* * * * *